Patented Aug. 8, 1950

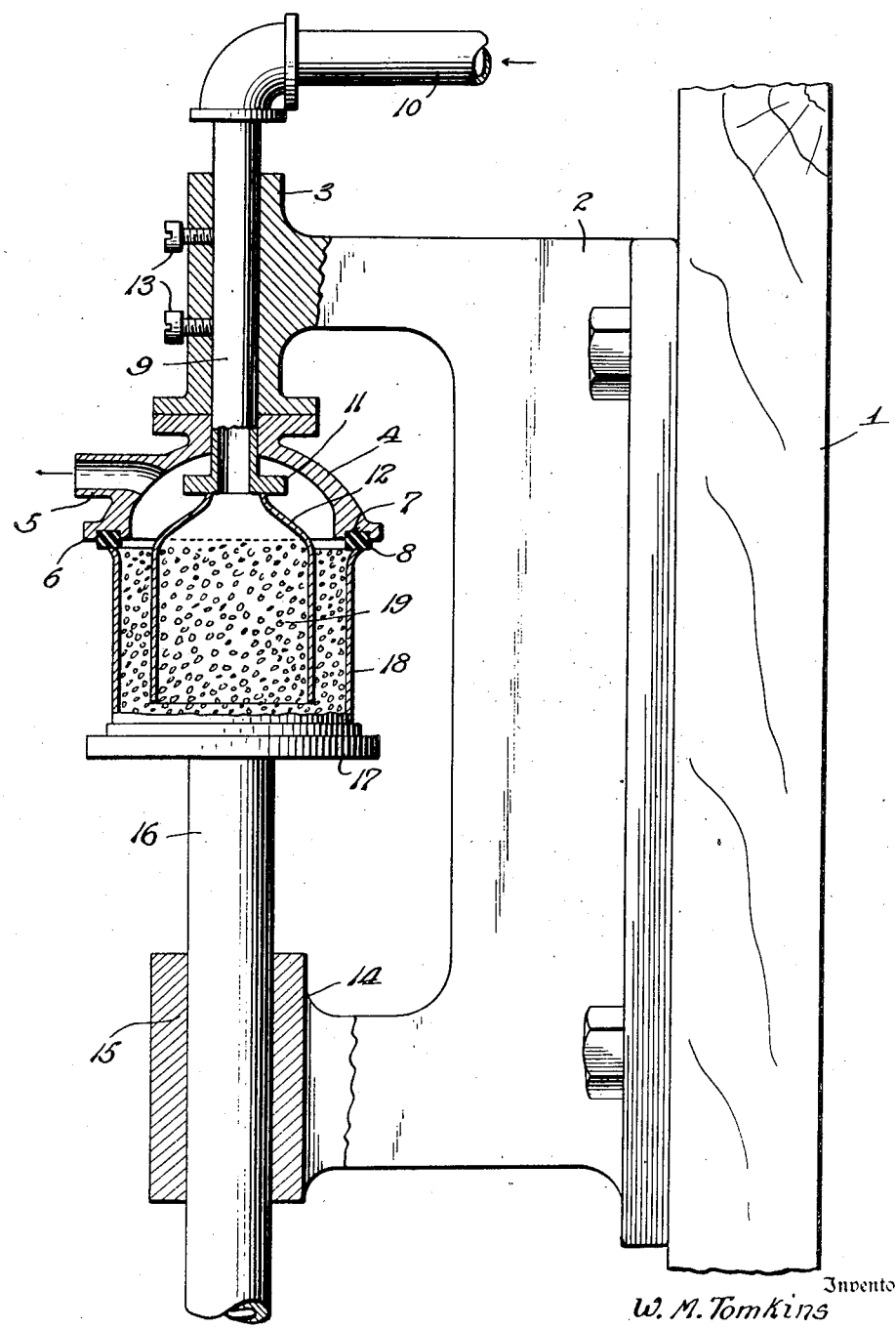

2,518,100

UNITED STATES PATENT OFFICE 2,518,100

METHOD AND APPARATUS FOR GASSING THE CONTENTS OF CANS

Walter M. Tomkins, Hinsdale, Ill., assignor to Continental Can Company, Inc., New York, N. Y., a corporation of New York Application October 29, 1945, Serial No. 625,185

12 Claims. (Cl. 99—152)

The following specification relates to an improved method and apparatus for gassing the contents of cans, particularly ground roasted coffee.

Proper preservation of any ground or powdered food products depends upon packing them in cans, jars or other containers with particular care being given to the exclusion of air. Such products include roasted coffee, cocoa, powdered milk, powdered eggs, flour, baking powder, sugar, desiccated fruits and vegetables and like food products. Materials of this type are apt to deteriorate in the presence of even a small amount of air or other reacting gases.

It is an object of my invention to scavenge the air from cans filled with ground or powdered material. Adequate protection of course, is dependent upon the removal of the air from all parts of the granular contents.

Another object of my invention is to replace detrimental air or other gas with either a gas such as nitrogen or carbondioxide which is inert toward the granular material, or with a gas which may impart to that material advantageous properties such as aroma or flavor.

In carrying out the purposes of my invention, it is also an object thereof to reduce the velocity of the stream of incoming gas so that it will penetrate the granular mass without establishing channels or limited passageways and fail to complete the scavenging of the undesired gas.

A still further object of my invention is to so treat the gas that there will be a minimum of disturbance or turbulence in the mass. This will prevent loss of the material entrained with the air or gas being evacuated.

Another object of my invention is to exert a buoyant effect on the material nearest the wall of the can or jar and thus facilitate the removal of the air by a thorough percolation by the inert treating gas.

A still further object of my invention is to provide simple but effective apparatus insuring the successful gassing of the material in filled cans.

Other objects of my invention will be evident from the following description of the process as applied to the treatment of roasted coffee in a ground or granular condition, utilizing the improved apparatus of my invention.

The accompanying drawing illustrates in elevation partly in vertical section, a preferred form of the apparatus designed for carrying out my method of gassing.

Generally speaking the apparatus provides means for advancing a filled can of coffee or the like into a position where its contents are permeated thoroughly by an incoming stream of treating gas. This incoming stream has its velocity reduced and is applied over a wide area of the material so that it percolates uniformly without disturbing the material. The treating gas first scavenges the broad central area of the mass and finally passes through the outer portion and is vented either to the atmosphere or through vacuum. The introduction of the treating gas is so adjusted that it is caused to flow substantially equally both inwardly through the center of the mass and outwardly through the peripheral portion.

Means by which these results are accomplished are illustrated in the drawing. The equipment is mounted upon a vertical wall 1 or similar support.

The apparatus comprises a turret or like frame 2 for holding the several parts in operative relationship.

One part of the turret consists of an upper standard 3.

A dome or head 4 is fixedly attached to the upper standard 3 and depends from the latter. On one side of the dome, there is a discharge outlet or passageway 5. This passageway discharges either to the atmosphere or through a source of vacuum not illustrated. The dome has a flaring lower edge terminating in the form of a flange 6. This flange may be circular where the cans to be serviced are cylindrical or have a round open top. However, the flange 6 may be rectangular or irregular in shape to conform to the shape of the container selected.

The bottom surface of the flange 6 is recessed as at 7 to receive a gasket 8. The gasket 8 is of gas-tight material in order to prevent leakage of gas at this point.

A tube 9 is adjustably held in vertical position running through the upper standard 3. The upper end of the tube is connected by a bend to a pipe 10 which leads from the gas tank or other source of gas with which the material is to be treated. The lower end of the tube 9 is flanged as indicated at 11 and carries a fixed bell 12. This bell is of thin material such as spun metal, glass or the like. It is intended to confine the incoming gas, but at the same time must be capable of easily and quickly penetrating the granular material filling the cans being treated. Due to the bell shape, this forms a sort of flaring funnel by which the velocity of the incoming gas through the tube 9 is reduced and the gas uniformly spread over the full cross section of the bell 12.

The bell ordinarily is of circular cross section, although it may be of other shape to conform with the cans being treated.

Set screws 13, 13 in standard 3 are provided for the purpose of fastening the tube 9 and consequently the bell 12, in the desired position relative to the dome 4 and the can being treated. The bell 12 is therefore caused to project below the dome 4 and into the can to the desired degree for satisfactory operation.

The lower standard 14 of the turret 2 is arranged beneath the upper standard 3. The lower standard has a slide bearing 15 in axial alinement with the tube 9. A slide rod 16 is journaled in the bearing 15 and provided with means, not illustrated, for vertical reciprocation toward and away from the bell 12. The transverse platform or plate 17 forms the upper end of the slide rod 16. The plate serves to receive a can 18 and means are provided in the plate 17 to center the can so that the upper edge of the can will be directly opposite the gasket 8.

The contents 19 of the can may be roasted, ground coffee or any other powdered or granular material and should substantially fill the can 18.

In the operation of the apparatus, a filled can 18 is placed upon the platform 17 and the slide rod raised to bring the open end of the can into gas tight engagement with the gasket 8.

Previously the tube 9 has been fastened by means of set screws 13, 13 into adjusted position so that the bell 12 will project to the desired distance within the contents 19.

The optimum condition in actual practice has been found to proportion the bell 12 so that the cross sectional area of the material contained within it shall be substantially equal to the annular space between the side wall of the bell 12 and the side wall of the can. In fact, as a practical matter the annular cross section should be slightly less than the inside area to maintain a back pressure of gas throughout the material within the bell.

Thus the gas under pressure on the inside of the bell has substantially the same velocity going down into the coffee as it has on its way up outside the bell.

In further conformance with this ratio, it is preferred to adjust the height of the bell so that its lower edge is spaced from the bottom of the can enough to provide a circular passageway from the central to the outer area which shall have a cross sectional area substantially equal to that of each of the central and outer areas.

The gas which is to be used for scavenging is brought in through pipe 10 and tube 9. It may be any gas which is inert toward the contents of the cans. Thus in the preservation of ground and roasted coffee where the presence of air is detrimental, the selected gas may be nitrogen, carbondioxide, or similar inert gas. It may at the same time carry gaseous aroma or volatile flavoring materials. The stream of gas coming through the pipe 9 will have its velocity reduced by reason of the flaring bell. Thus, the velocity of the gas applied to the cross sectional area or surface of the material has a reduced pressure and a uniform, even distribution.

The gas, after passing downwardly through the center area, will escape beneath the edge of the bell with substantially the same velocity after which it rises through the outer or annular portion of the contents where it thoroughly permeates even the most remote portions of material.

In the event that the cross sectional areas of the center portion and of the annular portion of material are equal, a slight back pressure will develop due to the fact that in the annular portion the gas must pass upwardly through the mass and is therefore resisted by the gravity of the latter. This effect may be enhanced by adjusting the size of the bell so that the area outside the bell is slightly less than the inside area.

At the same time it will be evident that the upward stream of gas has a slight buoyant effect upon the material in the outer area and this will further increase the permeation by the gas.

The gas having completed its scavenging travel through the material is withdrawn through the outlet 5. This may be a vent direct to the atmosphere.

However, in the treatment of some material, particularly coffee, the scavenging action may be expedited by applying a slight suction to the outlet 5. This suction may be a preliminary step by which the air in the can is rarified in anticipation of the influx of replacement or treating gas. This improves the permeation by the treating gas.

However, it is also possible to apply a vacuum through the outlet 5 simultaneously with the introduction of the inert gas current under pressure. This enables the use of lower velocities and increases the buoyant effect above described.

While the invention has been described as a method of gassing ground and roasted coffee, it may be applied with equal success to the treatment of other powdered foodstuffs and the like wherever gas such as air must be scavenged and replaced by inert or other gases. The invention is therefore subject to minor variation in routine and proportions without departing from the scope of the invention as defined in the following claims. In like manner the invention provides latitude in respect to the apparatus incidental to the novel process.

What I claim is:

1. The method of gassing pulverulent material in a can or the like which consists of partitioning the material downwardly into a central zone and a circumferential zone of substantially equal horizontal areas to a level spaced from the bottom of the can, and applying a current of treating gas under pressure to the material in the central zone.

2. The method of gassing pulverulent material in a can or the like which consists of partitioning the material downwardly into a central zone and a circumferential zone of substantially equal horizontal areas to a level spaced from the bottom of the can, evacuating the air from above the circumferential zone and applying a current of treating gas under pressure to the material in the central zone.

3. The method of gassing pulverulent material in a can or the like which consists of partitioning the material downwardly into a central zone and a circumferential zone of substantially equal horizontal areas to a level spaced from the bottom of the can, evacuating the air from above the circumferential zone and simultaneously applying a current of treating gas under pressure to the material in the central zone.

4. The method of gassing pulverulent material in a can or the like which consists of partitioning the material downwardly into a central zone and a circumferential zone to a level so spaced from the bottom of the can as to provide a passageway between the zones of cross-section equal to that of the central zone and applying a current of treating gas under pressure to the material in the central zone.

5. The method of gassing pulverulent material in a can or the like which consists of partitioning the material downwardly into a central zone and a circumferential zone to a level so spaced from the bottom of the can as to provide a passageway between the zones of cross-section equal to that of the central zone, evacuating the air from above the circumferential zone and applying a current of treating gas under pressure to the material in the central zone.

6. The method of gassing pulverulent material in a can or the like which consists of partitioning the material downwardly into a central zone and a circumferential zone to a level so spaced from the bottom of the can as to provide a passageway between the zones of cross-section equal to that of the central zone, evacuating the air from above the circumferential zone and simultaneously applying a current of treating gas under pressure to the material in the central zone.

7. Coffee gassing apparatus comprising a support, a dome mounted thereon, an outlet passageway from the dome, a pipe held by the support and projecting into the dome, an inverted funnel attached to the pipe, a shaft slidably carried by the support in alignment with the pipe and a transverse plate on the end of the shaft adapted to lift a filled can into edgewise engagement with the dome and uniformly surrounding the funnel.

8. Coffee gassing apparatus comprising a support, a dome mounted thereon, an outlet passageway from the dome, a pipe held by the support and projecting into the dome, an inverted funnel attached to the pipe, a shaft slidably carried by the support in alignment with the pipe and a transverse plate on the end of the shaft adapted to lift a filled can into edgewise engagement with the dome and uniformly surrounding the funnel, and means for adjusting the pipe to bring the edge of the funnel into the desired spaced relation to the bottom of the can.

9. Coffee gassing apparatus comprising a support, a dome mounted thereon, an outlet passageway from the dome, a gas-tight gasket on the peripheral edge of the dome, a gas-pressure pipe projecting into the dome, an inverted funnel attached to the pipe, a shaft slidably carried by the support in alignment with the pipe and a transverse plate on the end of the shaft adapted to lift a filled can into edgewise engagement with the dome and uniformly surrounding the funnel.

10. Coffee gassing apparatus comprising a support, a dome mounted thereon, a vacuum outlet passageway from the dome, a gas-tight gasket on the peripheral edge of the dome, a gas-pressure pipe projecting into the dome, an inverted funnel attached to the pipe, a shaft slidably carried by the support in alignment with the pipe and a transverse plate on the end of the shaft adapted to lift a filled can into edgewise engagement with the dome and uniformly surrounding the funnel.

11. Coffee gassing apparatus comprising a support, a dome mounted thereon, an outlet passageway from the dome, a gas-tight gasket on the peripheral edge of the dome, a gas-pressure pipe projecting into the dome, an inverted funnel attached to the pipe, a shaft slidably carried by the support in alignment with the pipe and a transverse plate on the end of the shaft adapted to lift a filled can into edgewise engagement with the dome, said funnel projecting into the contents of the can and dividing it into a central zone and a circumferential zone of substantially equal areas.

12. Coffee gassing apparatus comprising a support, a dome mounted thereon, an outlet passageway from the dome, a gas-pressure pipe projecting into the dome, an inverted funnel attached to the pipe, a shaft slidably carried by the support in alignment with the pipe, a transverse plate on the end of the shaft adapted to lift a filled can into edgewise engagement with the dome, and means on the support for adjusting the pipe to cause the funnel to project the desired extent into the contents of the can.

WALTER M. TOMKINS.

REFERENCES CITED

The following references are of record in the file of this patent:

UNITED STATES PATENTS

| Number | Name | Date |
| --- | --- | --- |
| 1,738,233 | Conill | Dec. 3, 1929 |
| 1,992,556 | Tone | Feb. 26, 1935 |
| 2,131,181 | Kantor | Sept. 27, 1938 |
| 2,357,802 | Baechile et al. | Sept. 12, 1944 |